(12) United States Patent
Lin et al.

(10) Patent No.: US 7,581,580 B2
(45) Date of Patent: Sep. 1, 2009

(54) HYBRID YOKE FOR A VEHICLE DRIVESHAFT

(75) Inventors: Xi Lin, Northville, MI (US); Haimian Cai, Ann Arbor, MI (US); Puqiang Zhang, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 514 days.

(21) Appl. No.: 11/516,287

(22) Filed: Sep. 6, 2006

(65) Prior Publication Data

US 2008/0058108 A1    Mar. 6, 2008

(51) Int. Cl.
*B22D 19/04* (2006.01)
*B22D 19/16* (2006.01)

(52) U.S. Cl. .................. 164/98; 164/100; 164/111; 164/112

(58) Field of Classification Search .................. 164/98, 164/91, 100, 111, 112, 95
See application file for complete search history.

(56) References Cited

U.S. PATENT DOCUMENTS

| | | | | |
|---|---|---|---|---|
| 1,465,363 A | * | 8/1923 | Murray | 213/70 |
| 1,534,928 A | * | 4/1925 | Dugan | 164/98 |
| 4,881,924 A | * | 11/1989 | Gall | 464/134 |
| 5,203,740 A | | 4/1993 | Okuzumi et al. | |
| 5,647,683 A | * | 7/1997 | Easley | 403/359.6 |
| 6,003,229 A | | 12/1999 | Beduhn et al. | |
| 6,382,298 B2 | * | 5/2002 | Leith et al. | 164/98 |

* cited by examiner

*Primary Examiner*—Kevin P Kerns

(57) ABSTRACT

A hybrid yoke for a vehicle driveshaft assembly includes a cast iron portion having a pair of opposed yoke arms at a first end. The hybrid yoke also includes a steel portion having a yoke end and a shaft end, the shaft end for coupling to the driveshaft assembly and the yoke end for insertion into a second end of the cast iron portion.

8 Claims, 3 Drawing Sheets

HYBRID YOKE FOR A VEHICLE DRIVESHAFT

TECHNICAL FIELD

The present invention relates to a yoke and, more particularly, to a hybrid yoke having a cast iron portion and a steel portion for coupling to a vehicle driveshaft.

BACKGROUND OF THE INVENTION

A vehicle drive shaft, which is usually made from steel tubing, transfers rotational power from the transmission end to the differential of an axle assembly for rotatably driving the vehicle wheels. A yoke is typically welded to the shaft so as to provide a means for connecting two or more driveshafts together. The yoke is also typically made from forging steel to allow for strong bonding between the driveshaft and the yoke. However, forging steel is a relatively expensive material.

Thus, it is desirable to reduce the cost of the yoke while maintaining the strength of the bond between the yoke and the driveshaft.

SUMMARY OF THE INVENTION

In accordance with the present invention, a hybrid yoke for coupling to a driveshaft of an automotive vehicle includes a cast iron portion having a pair of opposed yoke arms at a first end. The hybrid yoke further includes a steel portion having a yoke end and a shaft end, the shaft end for coupling to the driveshaft assembly and the yoke end for insertion in a second end of the cast iron portion.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
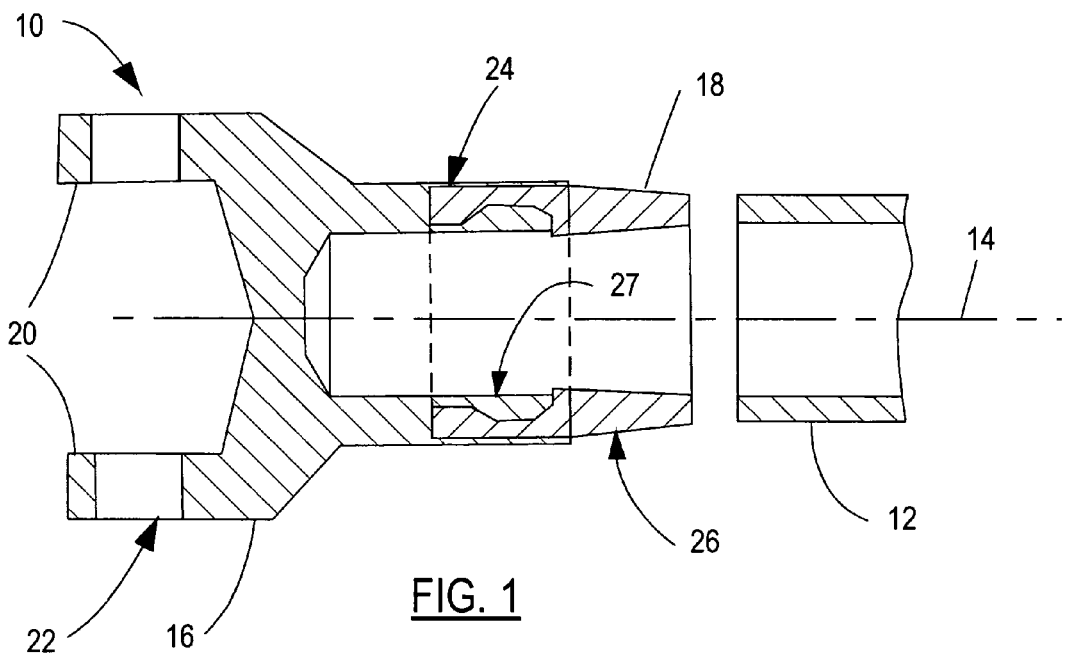
FIG. 1 is a cross sectional view of the hybrid yoke of the present invention.
Figure 2:
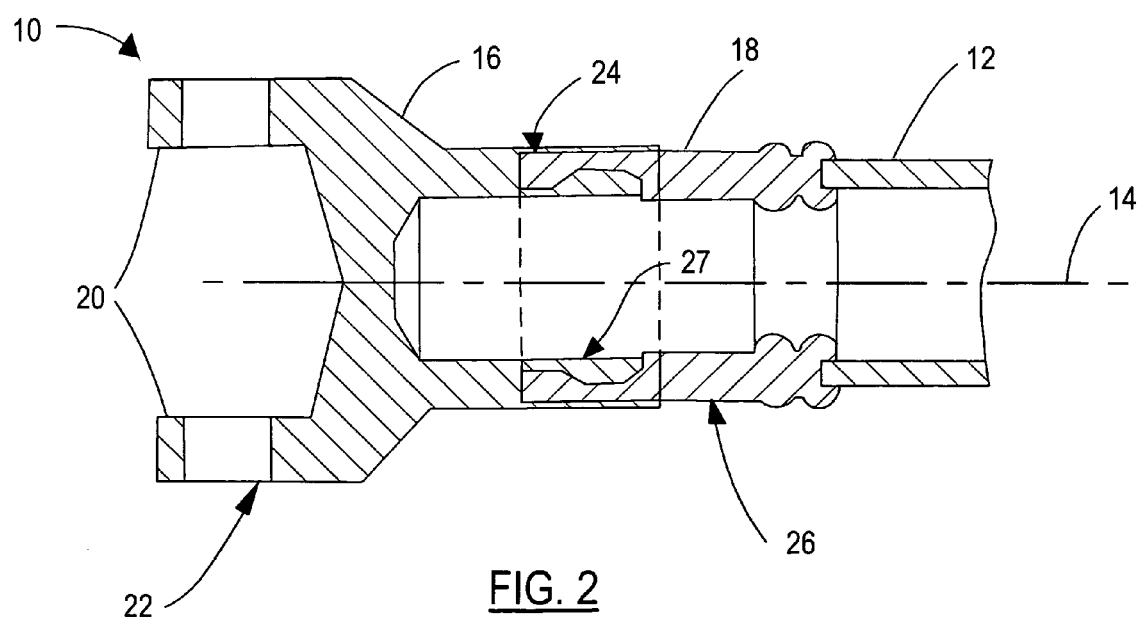
FIG. 2 is a cross sectional view illustrating the hybrid yoke of the present invention welded to a vehicle driveshaft.

As representative of the present invention, FIG. 1 illustrates a hybrid yoke 10 for coupling to a vehicle driveshaft 12, both of which are rotatable about a longitudinal axis 14. The hybrid yoke 10 of the present invention has two portions of materials to replace the traditionally high cost of a forged steel yoke. The major portion is a cast iron portion 16 which provides a low cost material and manufacturing. The other portion is a steel portion 18 for coupling with the driveshaft 12 utilizing a well known friction welding process, as illustrated in FIG. 2.

The cast iron portion 16 includes a pair of opposing arms 20 at a first end 22 thereof. The pair of opposing arms 20 extends generally axially from the first end 22 of the hybrid yoke 10. The arms 20 are generally symmetrical and are radially spaced relative to one another.

The steel portion 18 has a yoke end 24 and a shaft end 26. The yoke end of the steel portion 18 is inserted into a second end 27 of the cast iron portion 16 of the hybrid yoke 10. The shaft end 26 of the steel portion is coupled to the driveshaft 12. The hybrid yoke 10 including the cast iron portion 16 and the steel portion 18 is generally Y-shaped in form.

Figure 3:
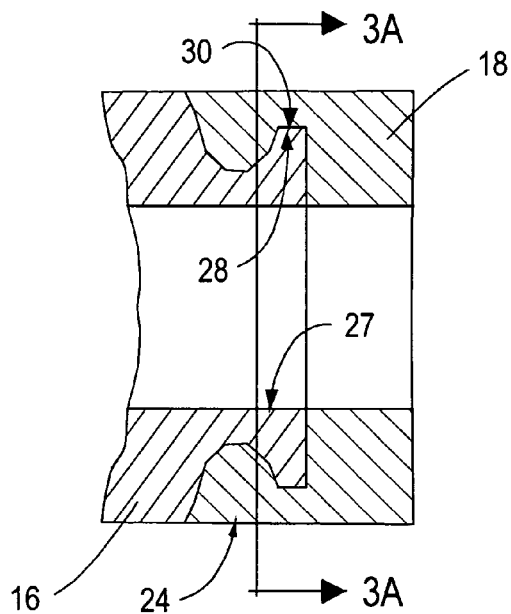
FIG. 3 is a cross sectional view of a preferred interlock feature associated with the hybrid yoke of the present invention.
Figure 3A:
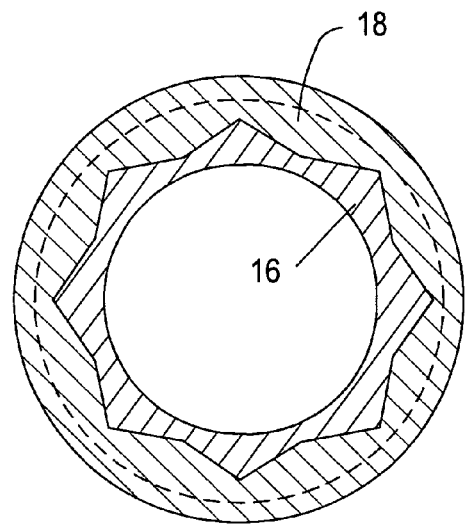
FIG. 3A is a view of the interlock feature taken in a direction shown by A-A in FIG. 3.

The cast iron portion 16 and the steel portion 18 is coupled together via an interlock feature that enhances the bond strength between the cast iron material and the steel material, while insuring torque transfer between the hybrid yoke 10 and the driveshaft 12. In a first embodiment, as shown in FIGS. 3 and 3A, the cast iron portion 16 has a radially outward extending tab 28 formed at the second end 27 of the hybrid yoke 10. The steel portion 18 has a radially inward extending groove 30 formed at the yoke end 24 for receiving the tab 28 of the cast iron portion 16. The tab 28 and groove 30 are preferably segmented for additional strength, but may be formed continuously.

Figure 4:
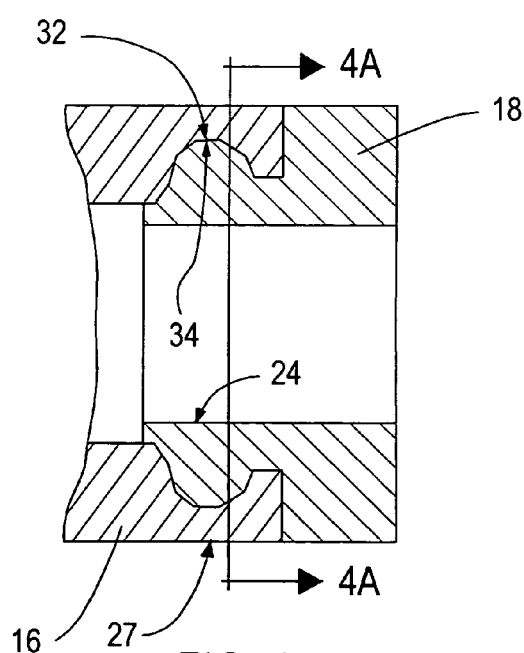
FIG. 4 is a cross sectional view of an alternative interlock feature associated with the hybrid yoke of the present invention.
Figure 4A:
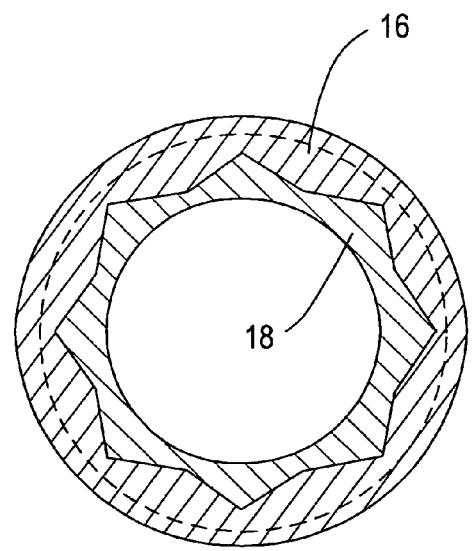
FIG. 4A is a view of the interlock feature taken in a direction shown by A-A in FIG. 4.

In an alternative embodiment, the cast iron portion 16 has a radially inward extending notch 32 formed at the second end 27 and the steel portion 18 has a radially outward extending shoulder 34 formed at the yoke end 24 for cooperating with the notch 32 of the cast iron portion 16, as shown in FIGS. 4 and 4A. As in the first embodiment, the notch 32 and shoulder 34 are preferably segmented for additional strength, but may be formed continuously.

Figure 5:
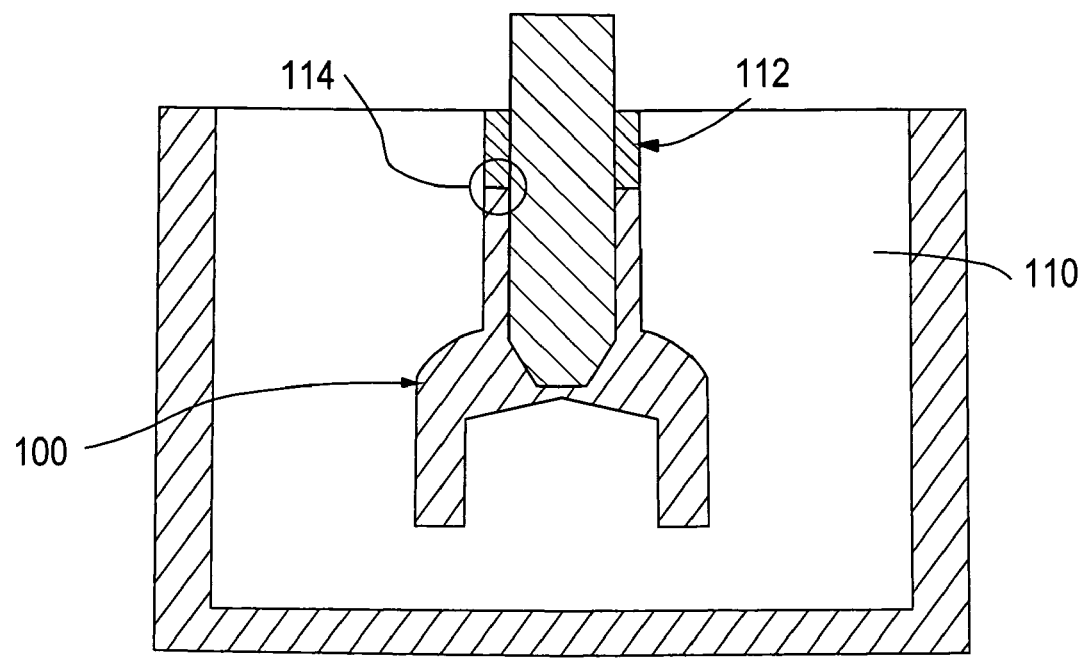
FIG. 5 is a schematic view illustrating a first method of making the hybrid yoke of the present invention.

The hybrid yoke 10 of the present invention is formed by way of an insert casting process. In a first insert casting process, as shown in FIG. 5, a precast iron 100 corresponding to the cast iron portion 16 is placed in a mold 110 to act as a mold insert. Then, molten steel 112 is poured into the mold 110 and a solid and diffusion bond between the cast iron 100 and the steel 112 is allowed to form. A coating material, e.g., copper, could be applied to enhance the bonding between the cast iron 100 and the steel 112 at 114 since the cast iron 100 has a different molten temperature than steel 112. Alternatively, a heating process could be applied in the cast iron 100 close to the conjunction area between the two materials, 114, if a coating material is not used.

Figure 6:
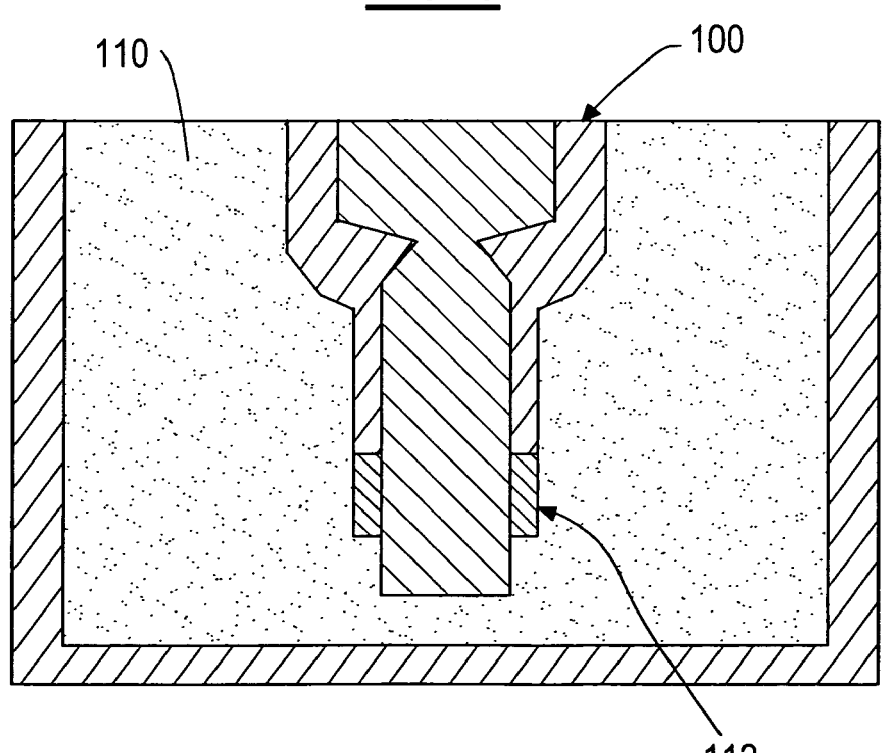
FIG. 6 is a schematic view illustrating a second method of making the hybrid yoke of the present invention.

In FIG. 6, an alternative method for making the hybrid yoke 10 of the present invention is illustrated. Here, a pre-made steel portion 112 is placed into the mold 110 and acts as an insert. Then, molten iron 100 is poured into the mold 110. Again, a solid and diffusion bond between the cast iron 100 and the steel 112 is allowed to form. As in the first method, a coating material could be applied to enhance the bonding between the cast iron 100 and the steel 112 at 114 since the cast iron 100 has a different molten temperature than steel 112.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for making a hybrid yoke for a vehicle driveshaft assembly comprising:

pre-forming a cast iron portion having a first end and a second end, the first end having a pair of opposed yoke arms thereat;

placing the cast iron portion into a mold defining a shaft-receiving position of the hybrid yoke; and pouring molten steel into the mold to form the shaft-receiving portion having a yoke end and a shaft end, the shaft end for coupling to the driveshaft assembly, and wherein the yoke end and the second end of the cast iron portion cooperatively form an interlocking bond after solidifying.

2. The method as recited in claim 1 wherein pre-forming the cast iron portion includes pre-forming a radially inward extending groove formed at the second end and wherein pouring molten steel further includes pouring molten steel into the mold to form the shaft receiving portion having a radially outward extending tab formed at the yoke end for receipt by the groove formed at the second end of the cast iron portion.

3. The method as recited in claim 1 wherein pre-forming the cast iron portion includes pre-forming a radially outward extending shoulder formed at the second end and wherein pouring molten steel further includes pouring molten steel into the mold to form the shaft receiving portion having a radially inward extending notch formed at the yoke end for receiving the shoulder formed at the second end of the cast iron portion.

4. The method as recited in claim 1 further comprising applying a coating material prior to pouring the molten steel.

5. A method for making a hybrid yoke for a vehicle driveshaft assembly comprising:

pre-forming a steel portion having a yoke end and a shaft end, the shaft end for coupling to the driveshaft assembly;

placing the steel portion into a mold defining a pair of opposed yoke arms; and pouring molten iron into the mold around the steel portion to form a cast iron portion having a first end and a second end, the first end having the pair of opposed yoke arms thereat, wherein the cast iron portion and the steel portion cooperatively form an interlocking bond after solidifying.

6. The method as recited in claim 5 wherein pre-forming the steel portion includes pre-forming a radially outward extending tab formed at the yoke end and wherein pouring the molten iron into the mold includes pouring molten iron into the mold to form the cast iron portion having a radially inward extending groove formed at the second end for receiving the tab of the pre-formed steel portion.

7. The method as recited in claim 5 wherein pre-forming the steel portion includes pre-forming a radially inward extending notch formed at the yoke end and wherein pouring the molten iron into the mold includes pouring molten iron into the mold to form the cast iron portion having a radially outward extending shoulder formed at the second end for cooperating with the notch.

8. The method as recited in claim 5 further comprising applying a coating material prior to pouring the molten iron.

* * * * *